(12) United States Patent
Nagata et al.

(10) Patent No.: US 6,525,135 B1
(45) Date of Patent: Feb. 25, 2003

(54) MODIFIER FOR METHACRYLIC RESIN

(75) Inventors: Norio Nagata, Hyogo (JP); Katsumi Yamaguchi, Hyogo (JP); Akira Takaki, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/623,994

(22) PCT Filed: Jan. 12, 2000

(86) PCT No.: PCT/JP00/00113

§ 371 (c)(1),
(2), (4) Date: Sep. 12, 2000

(87) PCT Pub. No.: WO00/42104

PCT Pub. Date: Jul. 20, 2000

(30) Foreign Application Priority Data

Jan. 13, 1999 (JP) .......... 11-006313

(51) Int. Cl.$^7$ .......... C08L 51/06; C08L 33/00
(52) U.S. Cl. .......... 525/70; 525/78; 525/80; 525/83; 525/85; 525/228
(58) Field of Search .......... 523/201; 525/70, 525/78, 80, 83, 85, 228

(56) References Cited

U.S. PATENT DOCUMENTS

| | | | |
|---|---|---|---|
| 3,922,321 A | 11/1975 | Yusa et al. | |
| 4,730,023 A | 3/1988 | Sato et al. | 525/73 |
| 5,352,500 A | * 10/1994 | Memon | 525/146 |
| 5,726,245 A | 3/1998 | Numrich et al. | 525/85 |

FOREIGN PATENT DOCUMENTS

| | | |
|---|---|---|
| EP | 0 137 268 | 4/1985 |
| JP | 50-39745 | 4/1975 |
| JP | 56-79145 | 6/1981 |
| JP | 59102947 | 6/1984 |
| JP | 5-287162 | 11/1993 |
| JP | 10-324787 | 12/1998 |

OTHER PUBLICATIONS

Derwent Abstract Accession No. 99–090158; JP 10–324787A; Dec. 1998 (abstract).
Derwent Abstract Accession No. 93–383218; JP 5–28716A; Nov. 1993 (abstract).
Derwent Abstract Accession No. 90–226904; JP–2153912A; Jun. 1990 (abstract).
Derwent Abstract Accession No. 2001–031614; WO 200063289A; Oct. 2000 (abstract).
Derwent Abstract; JP 56–079145A; Jun. 1989 (abstract).
Derwent Abstract; JP 62–001747A; Jan. 1987 (abstract).
Derwent Abstract Accession No. 75–53066W; JP 50–039745A; Apr. 1975 (abstract).
Derwent Abstract Accession No. 96–065512; JP 7–324153A; Dec. 1995 (abstract).

* cited by examiner

Primary Examiner—Jeffrey Mullis
(74) Attorney, Agent, or Firm—Armstrong, Westerman & Hattori, LLP

(57) ABSTRACT

This invention provide a methacrylic resin modifier, which gives impact resistance and high transparency under wide ranges of molding conditions. More particularly, it provides a methacrylic resin modifier and a polymer processability modifier, which comprises a blend of an impact resistance modifier, wherein weight ratio of the impact resistance modifier and polymer processability modifier is from 95/5 to 80/20 and the polymer processability modifier has a specific viscosity of from 2.5 to 5.0 when measured in its 0.4% by weight toluene solution at 30° C.

12 Claims, No Drawings

MODIFIER FOR METHACRYLIC RESIN

TECHNICAL FIELD

This invention relates to a modifier for high transparency, which can stably provide high transparency under wide ranges of processing conditions in injection molding, particularly when it is used by blending in methacrylic resins.

BACKGROUND ART

Because of their high transparency and excellent weather resistance, methacrylic resins are frequently used in various fields such as lightening apparatuses and outdoor products.

However, it is well known that the transparency of thermoplastic resins which are characterized by their transparency, particularly methacrylic resins, changes within considerable ranges depending on their processing conditions such as injection molding conditions. In addition, in view of the insufficient strength, addition of various impact resistance modifiers has been attempted for the purpose of improving their strength. For example, techniques that relate to the modification of their impact resistance are disclosed in JP-B-55-27576 (the term "JP-B" as used herein means an "examined Japanese patent publication") and JP-A-62-230841 (the term "JP-A" as used herein means an "unexamined published Japanese patent application"). In that case, transparency of methacrylic resins is an essential condition to be maintained but is not sufficient condition from the practical point of view. It is therefore desirable to obtain moldings which can show high transparency and high quality stably under wide ranges of processing conditions.

However, when such resins are processed using the techniques so far disclosed, the just described requirement for obtaining moldings which can show high transparency and high quality stably under wide ranges of processing conditions cannot fully be satisfied. That is, moldings having high transparency can be obtained only within the range of narrow processing conditions, and the appearance of moldings becomes poor at the time of processing due to, for example, the aggregation of impact resistance modifiers. For example, when the molding temperature is increased with the aim of obtaining high transparency, thermal deterioration is apt to occur and burned marks are formed by only slight changes in the processing steps of the resin. On the other hand, when the injection molding temperature is set to a low level, the transparency is greatly spoiled. In other words, not only to simply ensure qualities of high transparency and high strength but also to obtain high transparency, high quality moldings stably within wide ranges of molding (processing conditions) are required as important factors in carrying out injection molding of methacrylic resins.

Though not related to the transparency as intended by the present invention, some attempts have been made to ensure moldings having stable high quality physical properties. For example, JP-B-1-29218 discloses a method in which the balance of strength and fluidity is improved by increasing fluidity using a methacrylic resin having a broad molecular weight distribution, and JP-B-2-2358 discloses a technique which uses a condition that an impact resistance modifier and a dispersing agent are blended in a latex form in order to avoid aggregation of the impact resistance modifier, as a means for reducing so-called fish eye at the time of extrusion molding.

However, these methods are different from the inventive idea of the present invention to narrow fluctuation range of transparency in injection molding under wide ranges of processing conditions.

In view of the above, it is an object of the present invention to provide a modifier which can modify impact resistance and provide high transparency products stably under broad processing conditions in injection molding, when it is used in methacrylic resins of which characteristic is transparency.

DISCLOSURE OF THE INVENTION

With the aim of developing a modifier which can add impact resistance-modifying effect to methacrylic resins without spoiling their transparency and also can keep the transparency of the object resin at a high level under wide ranges of molding conditions, the inventors of the present invention have conducted extensive studies and found that the aforementioned problems can be solved when an impact resistance modifier and a small amount of a polymer processability modifier are used in combination, thus resulting in accomplishment of the present invention.

Accordingly, the present invention relates to (1) a methacrylic resin modifier, which comprises a blend of an impact resistance modifier and a polymer processability modifier that has a specific viscosity of from 2.5 to 5.0 when measured at a concentration of 0.4% by weight and at a temperature of 30° C. using toluene as the solvent, wherein weight ratio of the impact resistance modifier and polymer processability modifier is from 95/5 to 80/20, (2) the methacrylic resin modifier according to (1) above, wherein the impact resistance modifier is obtained by polymerizing monomer components comprising from 70 to 100% by weight (to be referred simply to as "%" hereinafter) of a (meth)acrylic ester, from 0 to 30% of an aromatic vinyl monomer and from 0 to 30% of other copolymerizable monomer (100% in total), in the presence of an acrylic rubber and/or a conjugated diene rubber, and (3) the methacrylic resin modifier according to (1) or (2) above, wherein the polymer processability modifier is a polymer comprising from 50 to 70% of methyl methacrylate, from 1 to 50% of a (meth)acrylic acid alkyl ester, wherein the number of carbon atoms of the alkyl group is from 2 to 8, and from 0 to 30% of other copolymerizable monomer (100% in total).

BEST MODE FOR CARRYING OUT THE INVENTION

The methacrylic resin modifier of the present invention is a modifier which comprises a blend of an impact resistance modifier and a particular polymer processability modifier and can be used in most of the commercially available methacrylic resins without particular limitation.

The aforementioned methacrylic resin is not particularly limited, but it may contain preferably 50% or more, more preferably 70% or more, of a methacrylic ester. Also, as the methacrylic ester, methyl methacrylate is desirable, so that a resin containing preferably 50% or more, more preferably 70% or more, of methyl methacrylate is more desirable.

The ratio of said impact resistance modifier and polymer processability modifier in the aforementioned methacrylic resin modifier, namely (impact resistance modifier)/(polymer processability modifier), is from 95/5 to 80/20, preferably from 95/5 to 90/10, as weight ratio. The ratio of the polymer processability modifier if too small would bear no sufficient effect to improve the aforementioned problems and if too large would produce no greater effect in spite of the high amount of the methacrylic resin modifier but rather reduce the impact resistance-improving effect and cause a tendency to reduce transparency of the methacrylic resin. It is considered that the reduction of transparency occurs due to relatively high molecular weight of the polymer processability modifier, which reduces its compatibility with the corresponding methacrylic resin.

The aforementioned impact resistance modifier is used for improving impact resistance and strength of the base material methacrylic resin, and any modifier conventionally used for methacrylic resins can be used without particular limitation.

A preferred example of the modifier conventionally used for methacrylic resins is an impact resistance modifier (I) which is obtained by polymerizing monomer components (to be referred also to as "monomer (M)" hereinafter) comprising from 70 to 100%, preferably from 80 to 100%, of a (meth)acrylic ester, from 0 to 30%, preferably from 0 to 20%, of an aromatic vinyl monomer and from 0 to 30%, preferably from 0 to 15%, of other copolymerizable monomer (100% by weight in total), in the presence of an acrylic rubber and/or a conjugated diene rubber (to be referred also to as "rubber component (R)" hereinafter).

The term "a (meth)acrylic ester" means an acrylic ester, a methacrylic ester, or a mixture thereof.

Amount of the monomer (M) is preferably from 20 to 65 parts by weight (to be referred to as "part(s)" hereinafter), more preferably from 28 to 45 parts, based on 100 parts of the rubber component (R). The amount if larger than 65 parts would cause a tendency to reduce the strength-improving effect and if smaller than 20 parts would entail a difficulty in practically stably producing the modifier and also cause a tendency to reduce the strength-improving effect.

In this connection, when the (meth)acrylic ester in the monomer (M) which constitutes the impact resistance modifier (I) is less than 70%, it causes a tendency to reduce the strength-improving effect due to reduced compatibility. Also, when amount of the aromatic vinyl monomer exceeds 30%, it causes a tendency to reduce weather resistance.

Polymerization method of the impact resistance modifier (I) is not particularly limited, but a known emulsion polymerization is convenient from the practical point of view.

In this connection, the average particle size of the impact resistance modifier (I) in the latex of the rubber component (R) is preferably from 1,000 to 4,000 Å, more preferably from 1,500 to 3,000 Å, as a value measured by a light scattering method using a light source of 546 nm in wavelength. In addition, an acrylic rubber is desirable than a conjugated diene rubber from the viewpoint of weather resistance.

Examples of the aforementioned acrylic rubber include the compound produced in Example 1 which will be described later. They may be used alone or as a mixture of two or more.

Examples of the aforementioned conjugated diene rubber include those having an index of refraction adjusted by the copolymerization of a diene monomer with styrene. They may be used alone or as a mixture of two or more.

Examples of the aforementioned (meth)acrylic ester as a component of the monomer (M) include methyl methacrylate, ethyl methacrylate, butyl methacrylate, methyl acrylate, ethyl acrylate, n-butyl acrylate and n-octyl acrylate. These compounds may be used alone or as a mixture of two or more.

Examples of the aforementioned aromatic vinyl monomer as a component of the monomer (M) include styrene and α-methylstyrene. These compounds may be used alone or as a mixture of two or more.

Examples of the aforementioned other copolymerizable monomer include acrylonitrile. Such compounds may be used alone or as a mixture of two or more.

As the impact resistance modifier (I), various multi-layered structure substances are known, such as the multi-layered structure disclosed in JP-B-55-27576 and the modifier described in the examples which will be described later.

The aforementioned polymer processability modifier is used for further expanding the range of molding process conditions under which excellent transparency can be obtained.

It is necessary that the polymer processability modifier has a relatively large molecular weight, and a polymer having a molecular weight of from several times to several tens times (preferably from 10 times to 50 times) larger than that of the corresponding methacrylic resin (around 100,000 in weight average molecular weight) is generally effective. The molecular weight if similar to or lower than that of the corresponding methacrylic resin would bear no modifying effects of this invention. Also, the molecular weight if too large would cause large reduction of the transparency due to reduced compatibility with the matrix. Thus, the molecular weight is those showing a specific viscosity ($\eta_{sp}$) of from 2.5 to 5.0, preferably from 2.5 to 4.0.

In this case, the value $\eta_{sp}$ is calculated by a formula $\eta_{sp}=(\eta-\eta_0)/\eta_0$ using a viscosity $\eta$ obtained by dissolving the aforementioned polymer processability modifier in toluene at a concentration of 0.4% and measuring the solution at a temperature of 30° C. The value $\eta_0$ is the viscosity of the solvent (toluene). When the polymer processability modifier having the aforementioned viscosity is added in a small amount, viscosity of the melting system at the time of molding is slightly increased, but it exerts an effect to reduce dependence of transparency on processing conditions. Though its technical reason is not clear, it is considered that transparency is stabilized by increased melt elasticity of the system.

The aforementioned polymer processability modifier is preferably a polymer comprising from 50 to 70%, preferably from 60 to 70%, of methyl methacrylate from the viewpoint of the compatibility with the matrix, from 1 to 50%, preferably from 30 to 40%, of a (meth)acrylic acid alkyl ester, wherein the number of carbon atoms of the alkyl group is from 2 to 8, which is preferably used as a soft component in view of not spoiling weather resistance of the methacrylic resin, and from 0 to 30% of other copolymerizable monomer (100% in total). When the amount of methyl methacrylate is too high, its compatibility with the matrix is reduced and transparency of the methacrylic resin tends to decrease, due to increased stiffness of the molecule in addition to its relatively large molecular weight. That is, it is desirable to copolymerize a soft component in addition to methyl methacrylate from the practical point of view. However, when the ratio of methyl methacrylate is too small, it causes a tendency to reduce the effect in further expanding the range of molding process conditions under which excellent transparency can be obtained. Also, when the amount of the (meth)acrylic acid alkyl ester, wherein the number of carbon atoms of the alkyl group is from 2 to 8, exceeds 50% or is less than 1%, it causes a tendency to reduce the effect in further expanding the range of molding process conditions under which excellent transparency can be obtained.

Examples of the (meth)acrylic acid alkyl ester, wherein the number of carbon atoms of the alkyl group is from 2 to 8, include butyl methacrylate, ethyl acrylate, butyl acrylate, octyl acrylate and 2-ethylhexyl acrylate, which are practical from the viewpoint, for example, of cost. These compounds may be used alone or as a mixture of two or more. Among these compounds, butyl methacrylate and butyl acrylate are particularly preferable.

Examples of the aforementioned other copolymerizable monomer include styrene, α-methylstyrene and acrylonitrile. These compounds may be used alone or as a mixture of two or more.

The aforementioned polymer processability modifier can be produced by various polymerization methods known in the prior art, but an emulsion polymerization method is practical, because it is desirable that it has a relatively large molecular weight.

As a matter of course, the refractive index of this modifier must be adjusted to that of the methacrylic resin to be used as close as possible so that transparency of the obtained moldings is not spoiled.

As the aforementioned polymer processability modifier, commercially available products which can satisfy the aforementioned various conditions can be used (e.g., the polymer processability modifiers of KANE ACE PA series produced by Kaneka Corporation).

In this connection, the method for mixing the aforementioned impact resistance modifier and polymer processability modifier is not particularly limited, and it may be effected by blending powders of both modifiers and then blending the mixture with the methacrylic resin to be used or by blending the impact resistance modifier and polymer processability modifier, both obtained by polymerization, in the latex form, making the mixture into powder in the usual way and then blending the powder with a methacrylic resin.

Regarding the ratio of a methacrylic resin and the methacrylic resin modifier of the present invention, it is desirable that ratio of the methacrylic resin and methacrylic resin modifier, namely methacrylic resin/methacrylic resin modifier, is from 90/10 to 40/60, preferably from 85/15 to 50/50, as weight ratio.

EXAMPLES

Examples of the present invention are given below by way of illustration and not by way of limitation.

Unless otherwise indicated, all parts, ratios, percentages, etc. are by weight.

Example 1
(Production of Impact Resistance Modifier)
(a) Production of Crosslinked Methacrylic Polymer (Innermost Layer)

A mixture of the following composition was put into a glass reactor and heated to 80° C. while stirring in a stream of nitrogen, and then 25% of a mixed solution of innermost layer components of 25 parts of methyl methacrylate and 0.1 part of allyl methacrylate was added at once to carry out 45 minutes of polymerization.

| (Composition) | (Part) |
| --- | --- |
| Deionized water | 220 |
| Boric acid | 0.3 |
| Sodium carbonate | 0.03 |
| Sodium N-lauroylsarcosinate | 0.09 |

| (Composition) | (Part) |
| --- | --- |
| Sodium formaldehydesulfoxylate | 0.09 |
| Sodium ethylenediaminetetraacetate | 0.006 |
| Ferrous sulfate heptahydrate | 0.002 |

Next, remaining 75% of the mixed solution was continuously added spending 1 hour. After completion of the addition, the mixture was kept at the same temperature for 2 hours to complete the polymerization. During this period, 0.2 part of sodium N-lauroylsarcosinate was added. Average particle size of polymer particles in the thus obtained innermost layer crosslinked methacrylic polymer latex was 1,600 Å (calculated using light scattering of 546 nm wave length), and the polymerization conversion ratio ((amount of formed polymer/amount of charged monomer)×100 (%)) was 98%.

(b) Production of Acrylic Rubber

While keeping the crosslinked methacrylic polymer latex obtained in the above step (a) at 80° C. in a stream of nitrogen, 0.1 part of potassium persulfate was added and then a mixed monomer solution of 41 parts of n-butyl acrylate, 9 parts of styrene and 1 part of allyl methacrylate was continuously added spending 5 hours. During this period, 0.1 part of potassium oleate was added in three portions. After completion of the addition of the mixed monomer solution, 0.05 part of potassium persulfate was added, and the mixture was kept for 2 hours to complete the polymerization. Average particle size of acrylic rubber particles in the thus obtained polymer latex was 2,300 Å (calculated by light scattering method), and the polymerization conversion ratio was 99%.

(c) Polymerization of Outermost Layer (Production of Impact Resistance Modifier)

While keeping the rubber-like polymer latex obtained in the above step (b) at 80° C., 0.02 part of potassium persulfate was added. Then, a mixed solution of 24 parts of methyl methacrylate, 1 part of n-butyl acrylate and 0.1 part of t-dodecylmercaptan was continuously added spending 1 hour. After completion of the addition of the mixed monomer solution, the resulting mixture was kept for 1 hour to obtain a multi-layered structure graft copolymerization latex. Average particle size of acrylic rubber particles in the multi-layered structure graft copolymer latex was 2,530 Å (calculated by light scattering method), and the polymerization conversion ratio was 99%. By subjecting the thus obtained multi-layered structure graft copolymerization latex to salting out aggregation, heat treatment and drying in the usual way, a multi-layered structure graft copolymer, namely an impact resistance modifier, was obtained as a white powder.

(Production of Polymer Processability Modifier)

A reactor equipped with an agitator was charged with 200 parts of water, 1 part of sodium dioctylsulfosuccinate and 0.03 part of potassium persulfate, oxygen in the space and in water was removed by blowing nitrogen and then the contents were heated to 65° C. while stirring. Then, a monomer mixture (mixture A) of 60 parts of methyl methacrylate, 15 parts of butyl methacrylate and 15 parts of butyl acrylate was added spending 4 hours, and then 1 hour of stirring was continued at 65° C. to substantially complete the polymerization. Thereafter, a monomer mixture (mixture B) of 5 parts of butyl acrylate and 5 parts of methyl methacrylate was added spending 1 hour, and the contents were kept at 65° C. for 1.5 hours and then spontaneously cooled to obtain an emulsion polymerization latex. The polymerization conversion ratio was 99.2%. Also, average particle size of polymer particles of the emulsion polymerization latex was 650 Å when calculated by a turbidity method. By subjecting the thus obtained emulsion polymerization latex to salting out aggregation, heat treatment and drying in the usual way, a powdery sample was obtained. Specific viscosity of the thus obtained sample was 3.1.
(Blending with Methacrylic Resin and Production of Moldings)

A 0.1% portion of a phosphorus based stabilizer (TNPP: trisnonylphenyl phosphite) was added to a mixture of 37% of the multi-layered structure graft copolymer, 3% of the polymer processability modifier, both obtained in the aforementioned steps, and 60% of a methacrylic resin (methacrylic resin MG-102 manufactured by ICI, specific viscosity 0.122), 100% in total, and the resulting mixture was made into pellets by carrying out extrusion kneading at a cylinder. temperature C3: 210° C. using a vent-type single screw extruder (HW-40-28 manufactured by Tabata Kikai, ø 40 mm, L/D=28).

The thus obtained pellets were dried at 90° C. for 4 hours or more and then subjected to injection molding using a 16-OMSP-10 type making machine manufactured by Mitsubishi Heavy Industries under conditions of cylinder temperature at C3-zone: 230° C., nozzle temperature (N): 235° C. and injector screw speed: 20 mm/second, 50 mm/second or 90 mm/second, thereby obtaining a molding plate sample of 100 mm×150 mm×3 mm used for the evaluation of. physical properties. Also, another evaluation sample was molded under conditions of cylinder temperature C3: 250° C., nozzle temperature (N): 255° C. and injector screw speed: 90 mm/second, in order to examine transparency change depending on the molding temperature.

Using the thus obtained samples, haze was measured at a constant temperature of 23° C. in accordance with the procedure of JIS K 6714. The results are shown in Table 1.

Example 2

A polymer processability modifier was obtained in the same manner as described in Example 1, except that composition of the mixture A in the "polymer processability modifier production" step of Example 1 was changed to 60 parts of methyl methacrylate, 24 parts of butyl acrylate and 6 parts of styrene. Thereafter, moldings for evaluation were obtained in the same manner as described in Example 1 and the same measurement was carried out to be used as Example 2. The results are shown in Table 1.

Comparative Examples 1 to 3

Moldings for evaluation were obtained in the same manner as described in Example 1, except that amount of the polymer processability modifier was changed to 0, 1 or 11% and amount of the MG-102 was changed to 63, 62 or 52% in the "blending with methacrylic resin and production of moldings" step of Example 1, and the same measurement was carried out to be used as Comparative Examples 1, 2 and 3, respectively. The results are shown in Table 1.

Comparative Example 4

A polymer processability modifier was obtained in the same manner as described in Example 1, except that amount of potassium persulfate in the "polymer processability modifier production" step of Example 1 was changed to 0.08 part. Specific viscosity of the product was 1.5. Thereafter, moldings for evaluation were obtained in the same manner as described in Example 1 and the same measurement was carried out to be used as Comparative Example 4. The results are shown in Table 1.

Comparative Example 5

In the "polymer processability modifier production" step of Example 1, 0.005 part of potassium persulfate was used and spending 2 hours polymerization was carried out by charging total volume of the mixture A at once, and the mixture B was continuously charged in the same manner as described in Example 1, thereby obtaining a polymer processability modifier. Specific viscosity of the product was 5.8. Thereafter, moldings for evaluation were obtained in the same manner as described in Example 1 and the same measurement was carried out to be used as Comparative Example 5. The results are shown in Table 1.

TABLE 1

| | Transparency Hz (%) | | | |
|---|---|---|---|---|
| Example No. | C3: 230° C. N: 235° C. Screw speed: 20 mm/sec | C3: 230° C. N: 235° C. Screw speed: 50 mm/sec | C3: 230° C. N: 235° C. Screw speed: 90 mm/sec | C3: 250° C. N: 255° C. Screw speed: 90 mm/sec |
| Example 1 | 1.7 | 1.5 | 1.4 | 1.2 |
| Example 2 | 1.6 | 1.4 | 1.4 | 1.1 |
| Comparative Example 1 | 2.9 | 2.8 | 2.8 | 1.9 |
| Comparative Example 2 | 2.5 | 2.4 | 2.6 | 1.5 |
| Comparative Example 3 | 2.4 | 2.3 | 2.1 | 1.6 |
| Comparative Example 4 | 2.4 | 2.3 | 2.2 | 1.7 |
| Comparative Example 5 | 3.0 | 2.6 | 2.9 | 2.0 |

Thus, as is evident from the results shown in table 1, when the modifier of the present invention is blended with methacrylic resins, moldings having high transparency can be obtained with less influences by molding conditions.

What is claimed is:

1. A composition comprising:
  a methacrylic resin; and
  a blend of an impact resistance modifier and a polymer processability modifier, wherein the polymer processability modifier has a specific viscosity of from 2.5 to 5.0 when measured at a concentration of 0.4% by weight and at a temperature of 30° C. using toluene as the solvent, and wherein the weight ratio of the impact resistance modifier and polymer processability modifier is from 95/5 to 80/20.

2. The composition according to claim 1, wherein the impact resistance modifier is obtained by polymerizing monomer components comprising from 70 to 100% by weight of a (meth)acrylic ester, from 0 to 30% by weight of an aromatic vinyl monomer and from 0 to 30% by weight of other copolymerizable monomer (100% by weight in total), in the presence of an acrylic rubber, a conjugated diene rubber or a mixture thereof.

3. The composition according to claim 1 or 2, wherein the polymer processability modifier is a polymer comprising from 50 to 70% by weight of methyl methacrylate, from 1 to 50% by weight of a (meth)acrylic acid alkyl ester, wherein the number of carbon atoms of the alkyl group is from 2 to 8, and from 0 to 30% by weight of other copolymerizable monomer (100% by weight in total).

4. The composition according to claim 1, wherein the weight ratio of the impact resistance modifier and the polymer processability modifier is from 95/5 to 90/10.

5. The composition according to claim 2, wherein the impact resistance modifier is obtained from 20 to 65 parts by weight of the monomer components comprising a (meth) acrylic ester, an aromatic vinyl monomer and other copolymerizable monomer and 100 parts by weight of rubber components comprising an acrylic rubber, a conjugated diene rubber or a mixture thereof.

6. The composition according to claim 2, wherein the average particle size of the impact resistance modifier in the latex of the rubber component is from 1,000 to 4,000 Å as a value measured by a light scattering method using a light source of 546 nm in wave length.

7. The composition according to claim 2, wherein said (meth)acrylic ester is at least one compound selected from the group consisting of methyl methacrylate, ethyl methacrylate, butyl methacrylate, methyl acrylate, ethyl acrylate, n-butyl acrylate, and n-octyl acrylate.

8. The composition according to claim 2, wherein said aromatic vinyl monomer is at least one compound selected from the group consisting of styrene and α-methylstyrene.

9. The composition according to claim 2, wherein said other copolymerizable monomer is acrylonitrile.

10. The composition according to claim 2, wherein the specific viscosity of the polymer processability modifier when measured at a concentration of 0.4% by weight and at a temperature of 30° C. using toluene as the solvent is from 2.5 to 4.0.

11. The composition according to claim 3, wherein said (meth)acrylic acid alkyl ester is at least one compound selected from the group consisting of butyl methacrylate, ethyl acrylate, butyl acrylate, octyl acrylate and 2-ethylhexyl acrylate.

12. The composition according to claim 3, wherein said other copolymerizable monomer is at least one compound selected from the group consisting of styrene, α-methylstyrene and acrylonitrile.

* * * * *